(12) United States Patent
Bradshaw

(10) Patent No.: US 6,328,014 B1
(45) Date of Patent: Dec. 11, 2001

(54) CONTROL METHOD

(75) Inventor: Benjamin J Bradshaw, West Midlands (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/482,582

(22) Filed: Jan. 13, 2000

(30) Foreign Application Priority Data

Jan. 13, 1999 (GB) .................................................... 9900685

(51) Int. Cl.$^7$ ............................. F02D 41/16; F02D 41/40
(52) U.S. Cl. ............................................. 123/300; 123/436
(58) Field of Search ................................... 123/436, 299, 123/300; 701/110; 73/116, 117.3

(56) References Cited

U.S. PATENT DOCUMENTS

| | | | |
|---|---|---|---|
| 4,539,956 | * 9/1985 | Hengel et al. | 123/436 X |
| 5,117,793 | * 6/1992 | Taeu et al. | 123/436 |
| 5,582,152 | * 12/1996 | Drutel et al. | 123/436 |

FOREIGN PATENT DOCUMENTS 9-264160 * 10/1997 (JP).

* cited by examiner

Primary Examiner—Tony M. Argenbright
(74) Attorney, Agent, or Firm—Andrus, Sceales, Starke & Sawall

(57) ABSTRACT

A control method for controlling the operation of a compression ignition internal combustion engine comprising the steps of measuring the change in the engine speed which occurs during a period leading up to substantially the top-dead-center position of a cylinder of the engine, using the measured engine speed change in a delta speed change algorithm, and using the output of the delta speed change algorithm to derive a pilot fuel correction factor. The pilot fuel correction factor may be derived using a fuel balancing or correction algorithm. The method may also be used in conjunction with a fuel balancing algorithm for correcting or balancing the fuel quantities delivered in the main injections.

22 Claims, 2 Drawing Sheets

Algorithm to balance pilot injection.
750 rpm, 0.8 cmm imbalance

Algorithm to balance pilot injection.
750 rpm, 0.8 cmm imbalance

Comparison of data correction methods.

CONTROL METHOD

This invention relates to a control method for use in controlling the operation of a compression ignition internal combustion engine.

It is known to control the operation using the output of an algorithm, for example to derive a correction value or factor for use in determining the quantity of fuel which should be supplied to the cylinders of an engine in order to reduce cylinder-to-cylinder speed changes. The algorithm is typically supplied with data indicative of the speed of operation of the engine, for example by a rotary speed sensor which includes a camshaft or crankshaft mounted toothed wheel, and a sensor arranged to monitor the movement of the teeth of the wheel past a predetermined location. The algorithm typically uses the data indicative of the engine speed after each cylinder has passed its top-dead-centre position.

Where such a control method is used in controlling the operation of an engine having a fuel system arranged to deliver an initial, pilot injection to each cylinder followed by a main injection, it is difficult to determine from the output of the algorithm whether it is the quantity of fuel delivered during the pilot injection or that of the main injection which requires modification, and so the algorithm is not suitable for use in balancing the pilot fuel injection quantities.

According to the present invention there is provided a control method for controlling the operation of a compression ignition internal combustion engine comprising measuring the change in the engine speed which occurs during a period leading up to substantially the top-dead-centre position of a cylinder of the engine to obtain a measured engine speed change value, using the measured engine speed change value in a delta speed change algorithm, and using the output of the delta speed change algorithm to derive a pilot fuel correction factor.

The pilot fuel correction factor may be derived using a fuel balancing or correction algorithm.

The engine speed is conveniently measured for each cylinder of the engine over a period between 100° prior to the top-dead-centre position of each cylinder and the cylinder reaching substantially its top-dead-centre position.

The measured engine speed change value may be determined by measuring the engine speed when the engine occupies, for example, its 10° prior to top-dead-centre position and, for example, its top-dead-centre position, and calculating the difference between the measured engine speeds. The delta speed change algorithm is conveniently arranged to compare the measured engine speed change value with the equivalent value calculated for a previous cylinder of the engine. The fuel correction or balancing algorithm may be arranged to vary the quantity of fuel injected to each cylinder during the pilot injections of fuel to ensure that the engine speed change for each cylinder is substantially equal to that of the other cylinders.

The invention may be used in conjunction with a fuel correction or balancing algorithm for correcting or balancing the fuel quantities delivered in the main injections. As a result, the pilot and main injection quantities can be balanced at the same time.

In use, there may be circumstances, for example when the engine is operating at high speed or under a high load, in which balancing of the pilot injections is not necessary, and so the fuel correction or balancing algorithm may be disabled. There may also be circumstances in which balancing of the pilot injections is desirable, but engine conditions result in the output of the delta speed change algorithm being unreliable. In these circumstances, the pilot fuel correction factors used may be derived from factors calculated by the algorithm when the engine conditions gave rise to reliable algorithm outputs, for example when the engine was at idling speed and was operating under little or no load, or during a calibration operation, and stored in a suitable memory as a function of, for example, engine speed or load, vehicle speed, gear ratio or fuel pressure.

If desired, the same fuel correction or balancing algorithm may be used in controlling the fuel quantities used in both the pilot injection and the main injection. For example, after appropriate calibration has taken place, the engine may be operated using the fuel balancing or correction algorithm in conjunction with the output of the delta speed change algorithm, the fuel balancing or correction algorithm being used to control main injection using stored engine speed change values derived during the calibration operation or correction factors derived during calibration, and stored as a function of, for example, engine speed or load. If desired, when the engine is operating under conditions where a pilot injection is not necessary or balancing of the pilot injections is not required, then the fuel correction or balancing algorithm used to control the main injections may use the measured engine speeds and the output of the delta speed correction algorithm. In such an arrangement, the delta speed change algorithm output values or correction factors derived using the measured engine speeds may be used to update the values derived during calibration.

The operation of the delta speed change algorithm may be improved by correcting the calculated values of the engine speed change derived from the measured engine speed values to compensate for the local engine speed. It is known to use correction factors based upon the average engine speed measured over one or two crankshaft revolutions, but as the local engine speed (the speed over the period during which speed measurements are taken) may differ significantly from the average speed, such correction factors are inaccurate. It will be appreciated that the correction of calculated delta speed changes may have applications other than fuel correction or balancing, for example it may be used in misfire detection applications.

The invention will further be described, by way of example, with reference to the accompanying drawings, in which.

It is known to monitor the speed of operation of an engine by arranging for a toothed wheel to rotate at, for example, crankshaft speed, and providing a sensor arranged to monitor the movement of the teeth of the toothed wheel past a sensing position. The time interval between successive teeth passing the sensing position is indicative of the speed of operation of the engine, the time intervals becoming smaller when the engine speed increases, the time intervals increasing when the engine operates at a slower speed. It is also known to use the engine speed measurements after a cylinder of the engine reaches its top-dead-centre position in a fuel correction or balancing algorithm to control the quantity of fuel which must be supplied to each cylinder of the engine, for example to reduce speed variations between the firing stroke of one cylinder and the firing stroke of a successive cylinder. One of the outputs of the algorithm is known as the delta speed change.

Figure 1:
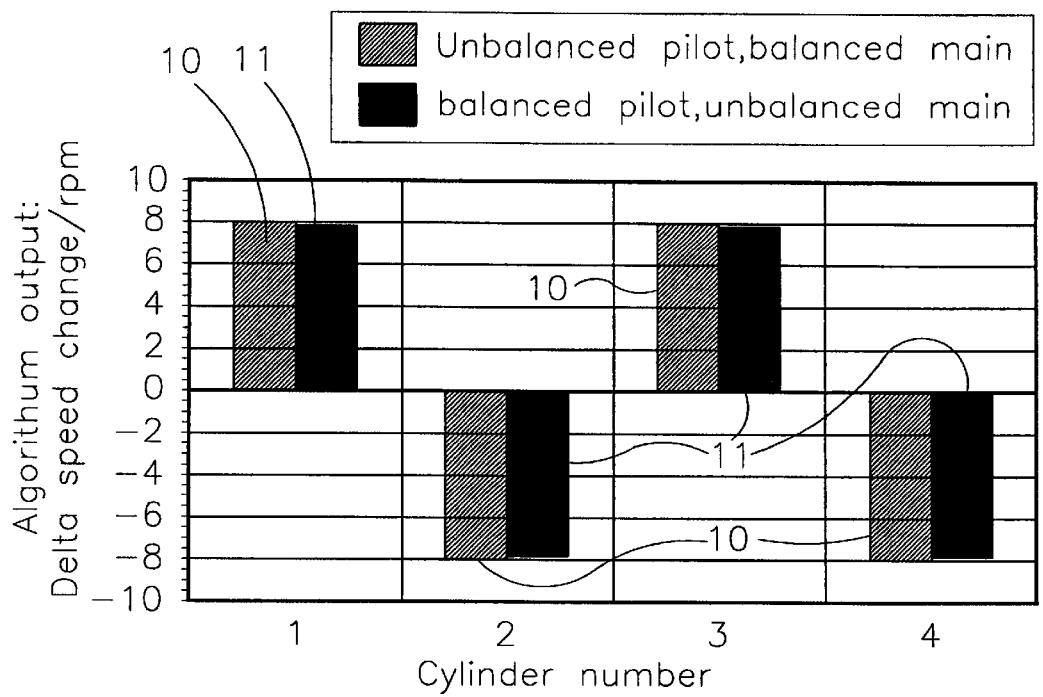
FIG. 1 is a graph illustrating the output of a delta speed change algorithm designed to permit balancing of the main injections of fuel.

The delta speed change in the arrangement illustrated in FIG. 1 is calculated as follows. A speed change is calculated by measuring the engine speed by timing the rotation of the crankshaft between its 37° after top-dead-centre position for a cylinder of the engine and its 217° after top-dead-centre position for that cylinder, and subtracting the measured speed from a second speed previously measured by timing the rotation of the crankshaft between its 143° prior to top-dead-centre position and its 37° after top-dead-centre position. The delta speed change is then calculated by subtracting a previous calculated speed change value from the current calculated speed change value.

FIG. 1 illustrates the delta speed change for each cylinder of an engine under two different sets of operating conditions. In one of the operating conditions, the main injections of fuel to the cylinders are balanced, but the pilot injections are unbalanced. The delta speed change values under these circumstances are denoted by reference numeral 10 in FIG. 1. The other set of operating conditions are such that the pilot injections are balanced but the main injections are unbalanced, and the delta speed change values under these conditions are denoted by reference numeral 11 in FIG. 1. As shown in FIG. 1, by comparing the magnitude of the outputs 10, 11, it is difficult to determine from the delta speed change values whether the variations result from the pilot injections being unbalanced or whether they result from the main injections being unbalanced. It will be appreciated that the output of the delta speed change algorithm as used for the main injections as described hereinbefore is unsuitable for use in balancing the pilot injections of fuel to the cylinders because the measurements are insensitive to speed changes resulting from the pilot injections being unbalanced.

Figure 2:
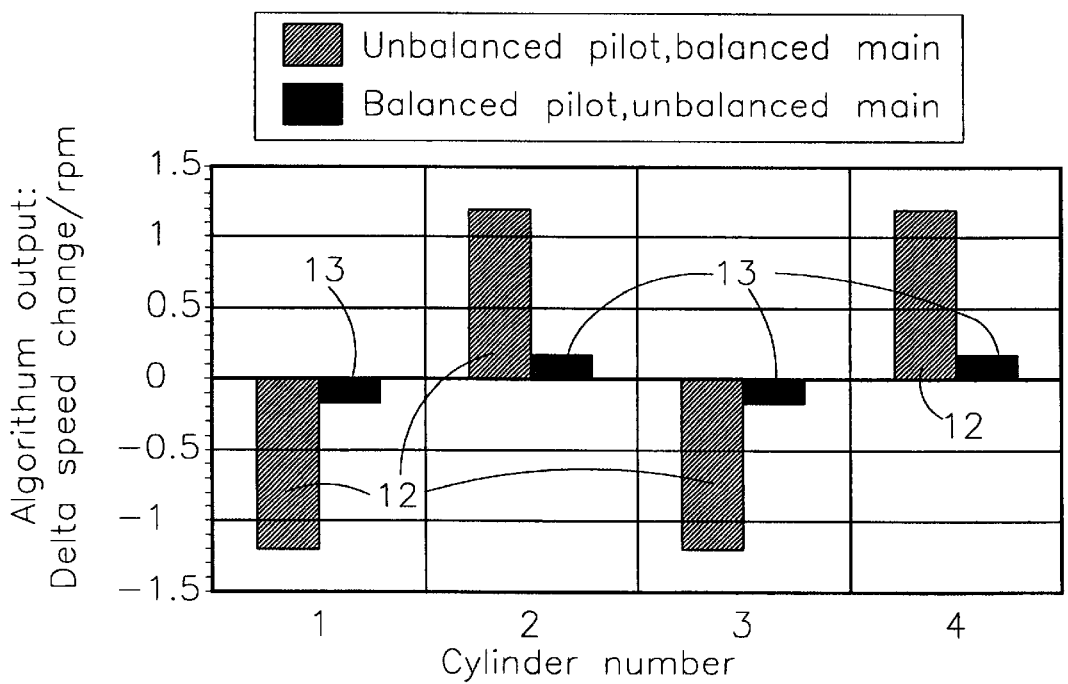
FIGS. 2 and 3 are graphs similar to FIG. 1 illustrating the output of an algorithm designed to permit balancing of pilot injections and forming part of a control method in accordance with an embodiment of the invention under various operating conditions.

In accordance with the invention, the delta speed change algorithm is supplied with engine speed measurements occurring over a period leading up to the top-dead-centre position for a cylinder of the engine. FIG. 2 illustrates an arrangement in which the speed measurements supplied to the delta speed change algorithm are taken at the 10° prior to top-dead-centre position of a cylinder and at the top-dead-centre position for that cylinder. In practice, the engine speed measurements are not made instantaneously, but are measured over an angle of 0.5° of crankshaft movement commencing at the 10° prior to top-dead-centre and top-dead-centre positions. The difference between the measured engine speeds, the delta speed, is calculated and the difference between the delta speed and that of a previous cylinder, the delta speed change, is calculated. In FIG. 2, reference numeral 12 denotes the delta speed change values derived using the delta speed change algorithm where the pilot injections are not balanced and the main injections are balanced, numeral 13 denoting the effect of having balanced pilot injections and unbalanced main injections upon the delta speed change values. It will be appreciated, by comparing FIG. 2 with FIG. 1, that by using the algorithm with engine speed measurements taken leading up to the top-dead-centre position, the algorithm output is sensitive to whether or not the pilot injections are balanced, and relatively insensitive to whether or not the main injections of fuel are balanced. As a result, the delta speed change values determined using the delta speed change algorithm may be used in a fuel correction or balancing algorithm for determining or deriving fuel correction values for use in modifying the quantity of fuel supplied to each cylinder during the pilot injections of fuel, for example in order to balance the pilot injections to ensure that the engine speed change which occurs due to the pilot injection of fuel to one cylinder is substantially equal to the speed change occurring as a result of the pilot injection of fuel to a subsequent cylinder.

Figure 3:
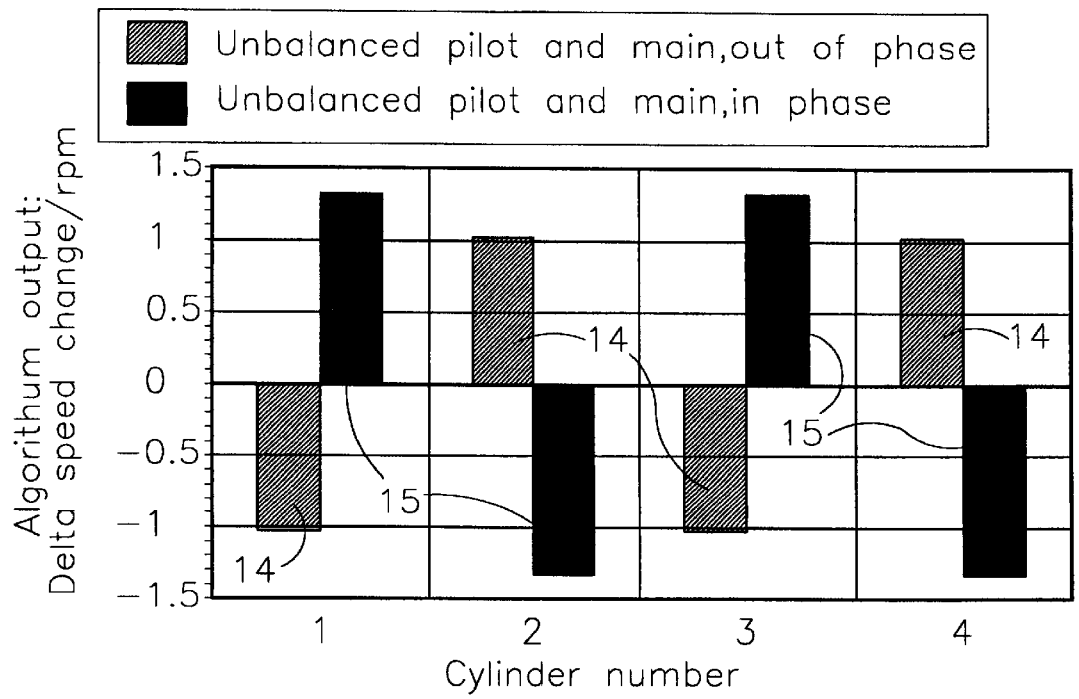

FIG. 3 illustrates the delta speed changes which occur when both the pilot and main injections are unbalanced, FIG. 3 illustrating both the case (denoted by reference numeral 14) where the pilot and main injections are out of balance (for example too much fuel is delivered during the pilot injection and too little is delivered during the main injection) and the case (denoted by reference numeral 15) where the pilot and main injections are in phase (for example too much fuel is delivered during both the pilot and main injections). The magnitude of the delta speed change depends upon the degree by which the injections are out of balance. In both cases the imbalance of the main injections was kept the same and the imbalance of the pilot injections was swapped between cylinders. From this, it will be appreciated that the delta speed change values are less sensitive to the main injection being out of balance than to the pilot injection being out of balance. As discussed hereinbefore, this is because the engine speed measurements are taken during a period prior to the delivery of the main injection of fuel.

Although, as described hereinbefore, the algorithms are used to permit balancing of the pilot injections of fuel to an engine, it will be appreciated that, if desired, the delta speed change algorithm may be used in conjunction with a typical fuel balancing or correction algorithm using the speed measurements after the commencement of delivery of fuel during the main injection, to permit balancing of both the pilot and main injections. Alternatively, the same fuel balancing or correction algorithm may be used to achieve balancing of the pilot and main injections. In this case, the engine is conveniently operated during a calibration phase to derive delta speed change algorithm output values or fuel correction factors over a range of engine speed and load or other conditions for subsequent use in controlling the main injections of fuel. After calibration has taken place, the engine is operated normally and the delta speed change algorithm is used in controlling the pilot injections of fuel, to ensure that the pilot injections are substantially balanced. The same fuel correction or balancing algorithm is used to control the balancing of the main injections using the delta speed change or fuel correction factor data derived during the calibration phase.

There may be circumstances in which it is not necessary to arrange for a pilot injection to occur at all, and in these circumstances, the algorithm for use in balancing the pilot injections may be disabled. Further, there may be circumstances in which, although the delivery of a pilot injection is desirable, it is not important to ensure that the pilot injections are balanced. Again, in these circumstances, the algorithm for use in balancing the pilot injections may be disabled. In normal use, the periods during which the pilot fuel correction or balancing algorithm is most likely to be disabled are those occurring where the engine is operating at high speed. Where the engine is operating at low speed, or is idling, it is desirable to arrange for the delivery of pilot injections to the engine and for the pilot injections to be balanced in order to reduce the levels of particulate emissions and in order to reduce engine noise. These advantages of pilot injection are of reduced effect where the engine is operating at higher speeds, and it may not be practical for pilot injections of fuel to occur where the engine is operating at very high speed.

Where the invention is used in circumstances in which the balancing of pilot injections of fuel may be disabled, then the method may be modified to ensure that, where pilot injection of fuel is to be balanced, the delta speed change algorithm uses the measured engine speeds prior to the delivery of the main injection to permit balancing of the pilot injections of fuel, balancing of the main injections being controlled using the stored delta speed change or fuel correction factors derived during calibration, and where the pilot injection of fuel is disabled or balancing of the pilot injections is disabled, then the delta speed change algorithm is used with engine speed values measured after the commencement of the main injection of fuel to balance the main injections. In such circumstances, the outputs of the algorithms may be used to update the data used to control the balancing of main injections where the pilot injections are to be balanced.

In a further alternative, the delivery of pilot injections may be disabled at regular intervals in order to permit updating of the data used to control the balancing of main injections.

The calibration operation may be performed immediately after assembly of the engine and fuel system, and calibration may be repeated during maintenance or servicing in order to ensure that the stored data is up to date.

It will be appreciated that the use of the control method described hereinbefore is dependent upon the accuracy with which the engine speed can be determined. It is well known that the change in crankshaft speed occurring as a result of a given disturbance, for example the firing of a cylinder, is related to the average engine speed. A known control method may, therefore, include a step of modifying the delta speed change values calculated using the algorithm to correct for the average engine speed prior to using the delta speed changes to calculate a fuel correction value. In such techniques, the average engine speed is generally calculated over 360° or 720° of rotation of the engine. It has been found, however, that the average engine speed during the period over which the engine speed is measured for the purposes of the control method of the present invention may differ significantly from the average engine speed measured over 360° or 720° of engine movement. It is therefore desirable to introduce a correction factor into the delta speed changes, the correction factor being based upon the local average engine speed. The local average engine speed is the average engine speed during the period over which the engine speed measurements for use in the algorithm are being taken. The average local engine speed is conveniently derived by measuring the time taken for the crankshaft to rotate between the first and last positions over which the speed is measured for the purpose of calculating the delta speed.

Figure 4:
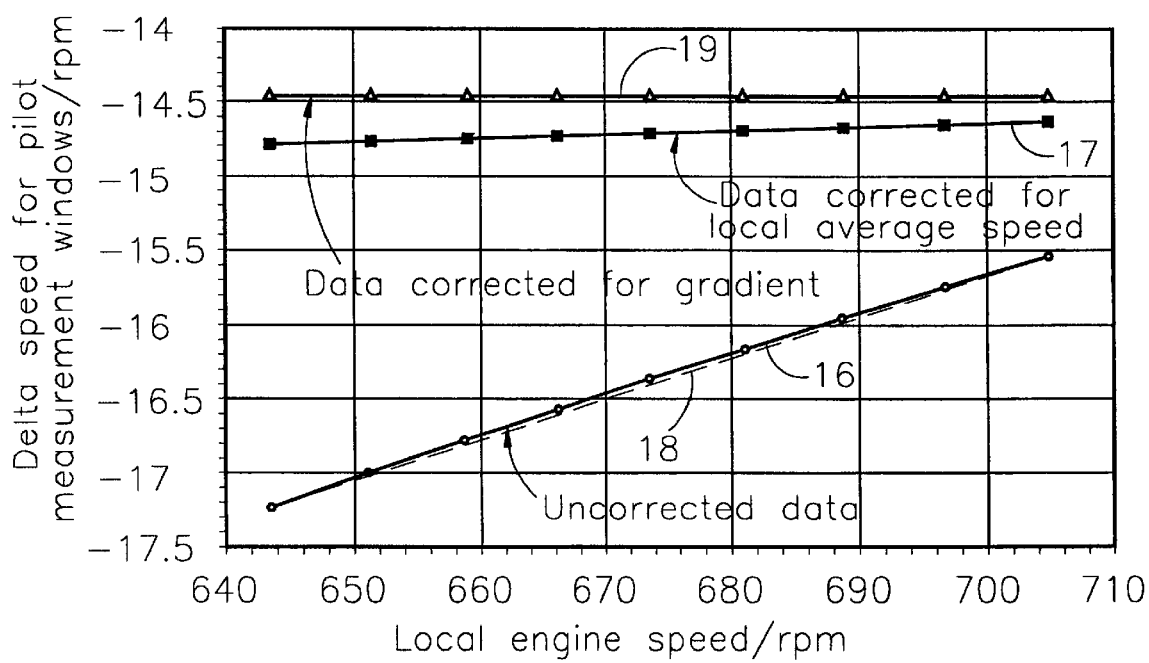
FIG. 4 is a graph illustrating the effect of two calculated speed change correction techniques.

The lower trace (denoted by reference numeral 16) in FIG. 4 illustrates the delta speed change values for the cylinders of an engine operating at a nominal speed of 750 rpm. The middle trace 17 in FIG. 4 illustrates the same data where a correction factor equal to the ratio of the local average engine speed and the average engine speed over 360° has been introduced. It will be appreciated that by correcting for the local average engine speed, the gradient of the slope of the data is reduced. If the fuel supplied to the cylinders of the engine during the pilot injections and main injections were properly balanced, then there would be no delta speed change and the curve would have a zero gradient.

An alternative technique for correcting the calculated delta speed change values uses the fact that the relationship between the delta speed change and the local average speed is slightly non-linear. This can be seen from the straight, dashed line 18 illustrated in FIG. 4 adjacent the uncorrected data line 16. It has been found that if the graph were re-plotted using the reciprocal of the average local engine speed, then the graph becomes more closely linear. If the gradient of this line is calculated and used as a correction factor in the following equation:

$$\text{delta speed (corrected)} = \left[\left(\frac{1}{\text{average speed}} - \frac{1}{\text{local average speed}}\right) \times \text{gradient}\right] + \text{delta speed (uncorrected)}$$

then the corrected data forms the top trace 19 illustrated in FIG. 4. Clearly, this trace is of almost zero gradient.

By correcting the calculated data speed change values using one of the techniques described hereinbefore before using the values in a fuel correction or balancing algorithm, the fuel correction factors necessary to balance the quantities of fuel supplied during the pilot and/or main injections can be calculated more accurately resulting in improved balancing.

Although the techniques for correcting the delta speed change values described hereinbefore are described in terms of improving the accuracy with which fuel correction values or factors can be derived, it will be appreciated that the techniques may be used in other applications, for example in applications in which the crankshaft speed is used to determine whether or not a misfire has occurred.

What is claimed is:

1. A control method for controlling the operation of a compression ignition internal combustion engine comprising:
    measuring the change in engine speed for each cylinder of said engine which occurs over a period between 10° prior to top-dead-centre position of the cylinder and the cylinder reaching substantially top-dead-centre position to obtain a measured engine speed change value;
    using said measured engine speed change value in a delta speed change algorithm to generate an output, and
    using said output of said delta speed change algorithm to derive a pilot fuel correction factor.

2. The method as claimed in claim 1, wherein said pilot fuel correction factor is derived using a fuel balancing or correction algorithm.

3. The method as claimed in claim 1, wherein said measured engine speed change value is determined by measuring said engine speed when said engine occupies a position 10° prior to said top-dead-centre position and at said top dead centre position and calculating the difference between said measured engine speeds.

4. The method as claimed in claim 1, wherein said pilot fuel correction factors are derived from factors calculated by said delta speed change algorithm when said engine is operating at idling speed and under little or no load.

5. The method as claimed in claim 4, wherein said pilot fuel correction factors are stored in a memory as a function of any one or more of engine speed, engine load, vehicle speed, gear ratio or fuel pressure.

6. The method as claimed in claim 1, wherein said pilot fuel correction factors are derived from factors calculated by said delta speed change algorithm during a calibration operation.

7. The method as claimed in claim 6, wherein said pilot fuel correction factors are stored in a memory as a function of any one or more of engine speed, engine load, vehicle speed, gear ratio or fuel pressure.

8. The method as claimed in claim 1, including the step of correcting said measured engine speed change values derived from said measured engine speed values to compensate for local engine speed.

9. The method as claimed in claim 8, including the step of using the corrected engine speed change values for the purpose of misfire detection.

10. A control method for controlling the operating of a compression ignition internal combustion engine comprising:
measuring the change in the engine speed which occurs during a period leading up to substantially top-dead-centre position of a cylinder of said engine to obtain a measured engine speed change value,
using said measured engine speed change value in a delta speed change algorithm to generate an output, wherein said delta speed change algorithm is arranged to compare said measured engine speed change value with an equivalent value measured for a previous cylinder of the engine, and
using said output of said delta speed change algorithm to derive a pilot fuel correction factor.

11. The method as claimed in claim 10, wherein said engine speed is measured for each cylinder of said engine over a period between 10° prior to top-dead-centre position of each cylinder and the cylinder reaching substantially said top-dead-centre position.

12. The method as claimed in claim 10, including the step of varying the quantity of fuel injected to each cylinder of said engine during the pilot injections to ensure that the engine speed change value for each cylinder is substantially equal to that of the other cylinders.

13. The method as claimed in claim 10, wherein said pilot fuel correction factor is derived using a fuel balancing or correction algorithm.

14. The method as claimed in claim 10, wherein said pilot fuel correction factors are derived from factors calculated by said delta speed change algorithm when said engine is operating at idling speed and under little or no load.

15. The method as claimed in claim 10, wherein said pilot fuel correction factors are derived from factors calculated by said delta speed change algorithm during a calibration operation.

16. A control method for controlling the operation of a compression ignition internal combustion engine comprising:
measuring the change in the engine speed which occurs during a period leading up to substantially top-dead-centre position of a cylinder of said engine to obtain a measured engine speed change value,
using said measured engine speed change value in a delta speed change algorithm to generate an output,
using said output of said delta speed change algorithm to derive a pilot fuel correction factor, and
using a fuel correction or balancing algorithm for correcting or balancing the fuel quantities delivered in a main injection so as to permit pilot and main injection fuel quantities to be balanced at substantially the same time.

17. The method as claimed in claim 16, wherein the same fuel balancing or correction algorithm is used to correct or balance said pilot and main injections.

18. The method as claimed in claim 16, wherein said fuel balancing or correction algorithm is used to control said main injections using stored engine speed change values derived during a calibration operation or pilot fuel correction factors derived during a calibration operation.

19. The method as claimed in claim 16, including the step of using said fuel correction or balancing algorithm to control said main injections when said engine is operating under conditions where a pilot injection is not necessary or is not required.

20. The method as claimed in claim 19, including the step of using said delta speed change algorithm output or said pilot fuel correction factors derived using said measured engine speeds to update engine speed change values derived during a calibration operation.

21. The method as claimed in claim 16, wherein said pilot fuel correction factors are derived from factors calculated by said delta speed change algorithm when said engine is operating at idling speed and under little or no load.

22. The method as claimed in claim 21, wherein said pilot fuel correction factors are stored in a memory as a function of any one or more of engine speed, engine load, vehicle speed, gear ratio or fuel pressure.

* * * * *